Aug. 1, 1961  G. W. CROWTHER  2,994,212
BULK MILK STORAGE TANK

Filed Feb. 26, 1959  4 Sheets-Sheet 1

INVENTOR.
George Wesley Crowther
BY J. W. Douglas
his atty.

Aug. 1, 1961

G. W. CROWTHER 2,994,212

BULK MILK STORAGE TANK

Filed Feb. 26, 1959

INVENTOR.
George Wesley Crowther
BY J. O. Douglas
His atty

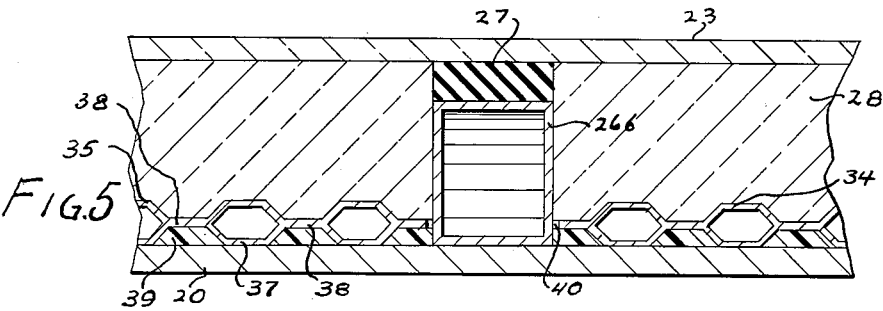
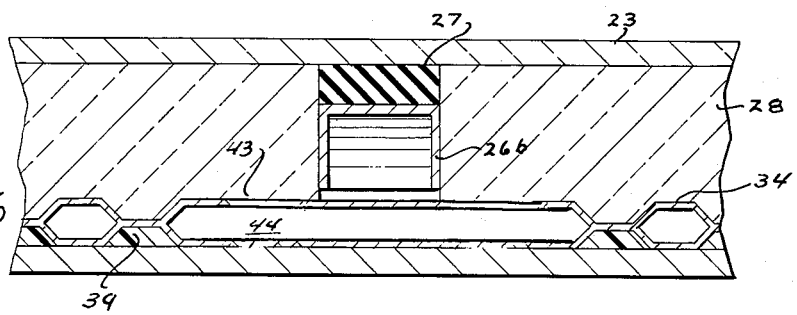
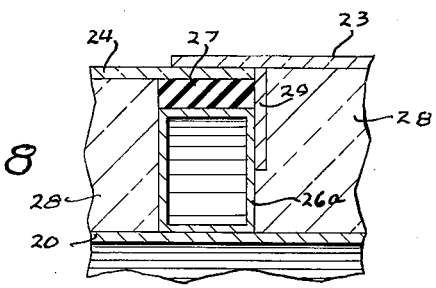
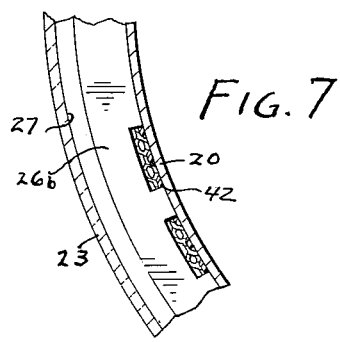
INVENTOR.
George Wesley Crowther

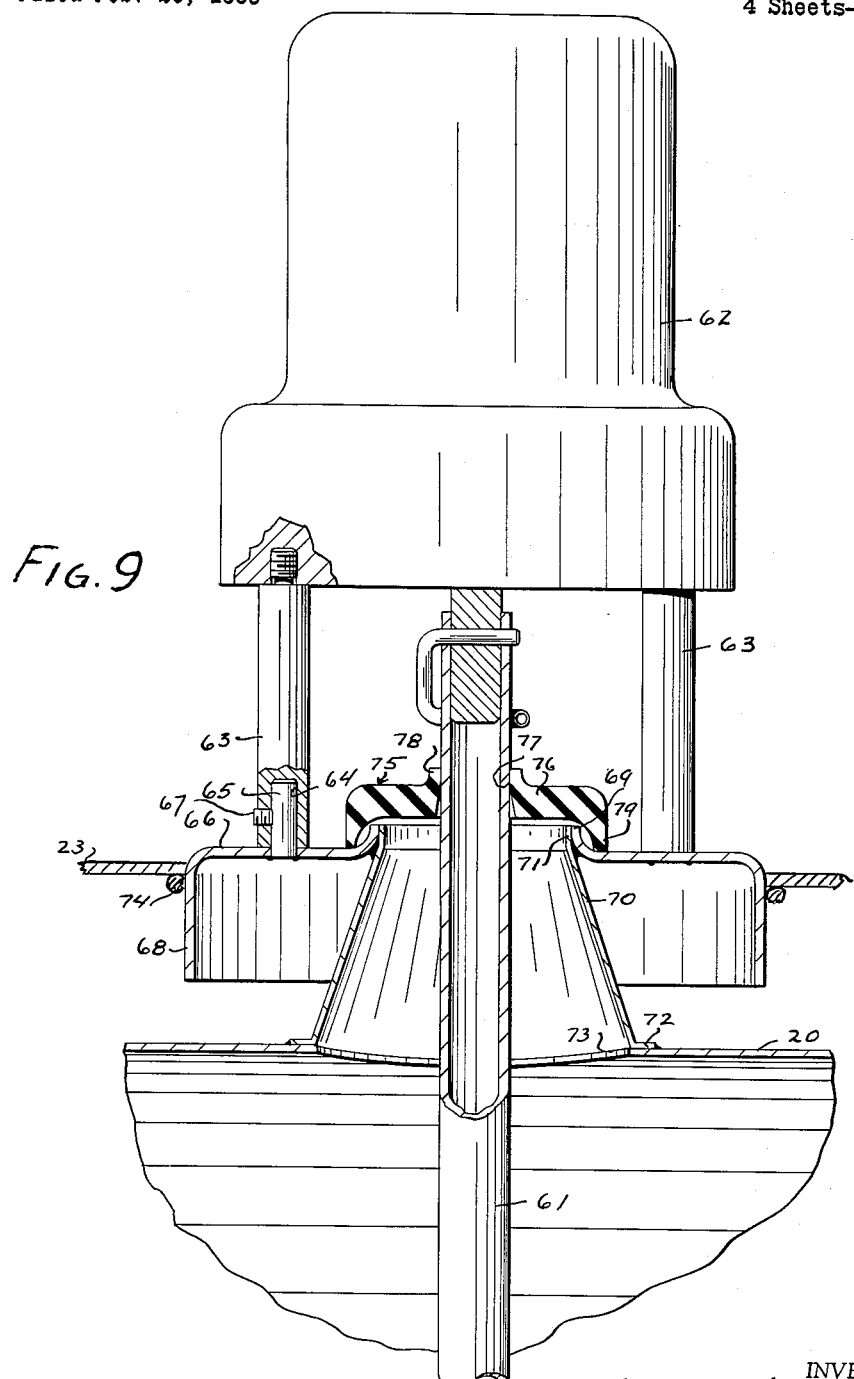

United States Patent Office 2,994,212
Patented Aug. 1, 1961

2,994,212
BULK MILK STORAGE TANK
George Wesley Crowther, 700 Garford Ave., Elyria, Ohio
Filed Feb. 26, 1959, Ser. No. 795,732
7 Claims. (Cl. 62—392)

This invention relates to vacuum storage tanks, particularly vacuum bulk milk tanks.

In recent years the trend on dairy farms has been toward the use of vacuum bulk milk tanks, which are connected to the milking machine while the latter are in operation and which have provision for drawing the milk by vacuum into the tank. The bulk milk tanks are refrigerated and are used to store the milk until the dairy tank truck comes by to withdraw the milk from the tank and take it to the dairy for processing.

Such tanks, in addition to being storage devices, are also measuring devices because they measure the volume of the stored milk. It is quite important that the tanks maintain their original shape and hold their calibration over an extended period of use. One of the problems connected with previous tanks of this general type is that they tend to expand and go out of shape under vacuum operation, so that their original calibration is no longer accurate.

Another difficulty connected with the previous vacuum bulk milk tanks is that they are not entirely satisfactory from the refrigeration standpoint. In some instances, the refrigeration arrangement is physically unsuitable from a practical standpoint. In other instances, the refrigerant carrying conduits extend around less than the lower half of the tank, so that the cooling effect which they provide is not as adequate as might be desired.

Still another problem associated with such vacuum storage tanks relates to the mounting of the agitator, which commonly is provided on the tank to stir the stored milk. Usually such agitators comprise a paddle or other stirring device inside the tank, a shaft connected to the paddle and extending upward therefrom through the top of the tank, a rubber "slinger" which provides a seal between the shaft and the top of the tank, and a motor on top of the tank connected to the shaft. In previous agitator mountings on such tanks, if the shaft is slightly off-center, it will wear against the slinger and cause pieces of rubber to drop off from the slinger into the milk in the tank. Moreover, with such agitator mountings it has been found virtually impossible to clean in place the space between the slinger and the portion of the tank which it engages, which gives rise to a further sanitation problem.

The present invention is directed to a vacuum storage tank which effectively solves all of the foregoing problems and has other important advantages over previous tanks of this general type.

Accordingly, it is an object of this invention to provide a novel and improved vacuum storage tank.

It is also an object of this invention to provide a vacuum storage tank having a novel construction which insures that the original shape and calibration of the tank are maintained over long periods of use.

Another object of this invention is to provide a novel vacuum storage tank having improved structural strength and rigidity.

A further object of this invention is to provide a novel vacuum storage tank having an improved refrigeration arrangement.

Also, it is an object of this invention to provide a vacuum storage tank having a novel and improved mounting for the agitator on the tank.

Other objects and advantages of the present invention will be apparent from the following detailed description of a presently preferred embodiment thereof, which is illustrated in the accompanying drawings.

In the drawings:

FIGURE 5 is a fragmentary section on an enlarged scale through the tank at the position on the evaporator designated by the line 5—5 in FIG. 4;

FIGURE 6 is a similar view at the position on the evaporator which is designated by the line 6—6 in FIG. 4;

FIGURE 7 is an enlarged fragmentary section through the tank at the position on the evaporator designated by the line 7—7 in FIG. 4;

FIGURE 8 is a fragmentary section on an enlarged scale taken along the line 8—8 in FIG. 2; and FIGURE 9 is an enlarged vertical section showing the mounting of the agitator in the present invention.

Figure 1:
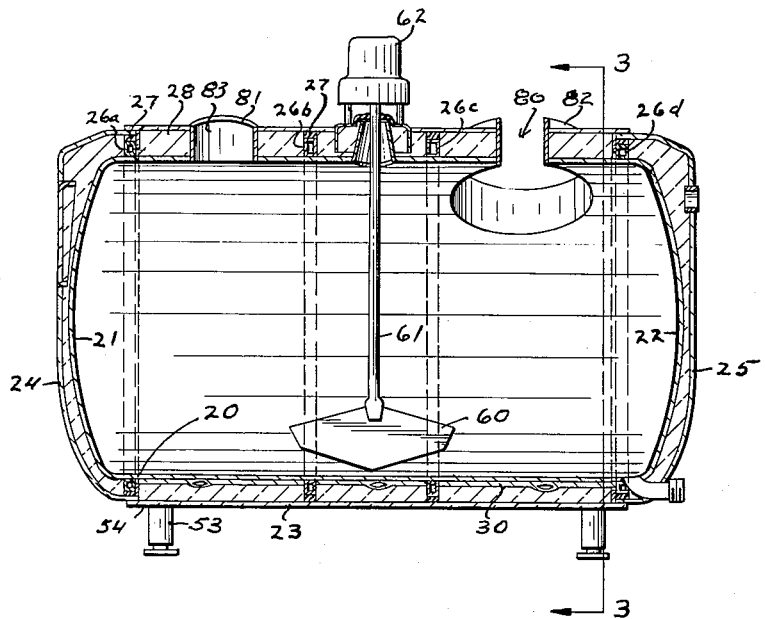
FIGURE 1 is a vertical section taken lengthwise through the tank with the motor-driven agitator mounted thereon.
Figure 2:
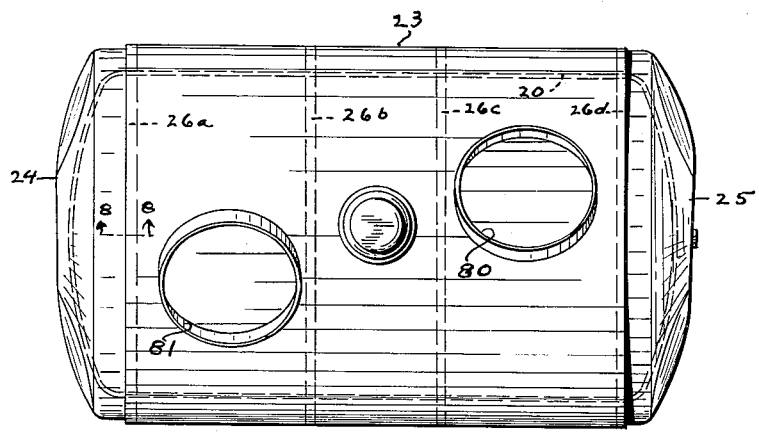
FIGURE 2 is a top plan view of the tank and agitator of FIG. 1.

Referring first to FIGS. 1 and 2, the present tank comprises a stainless steel inner shell which has a cylindrical side wall 20 and outwardly curved end walls 21 and 22. The outer shell of the tank is composed of a generally cylindrical side wall 23 and end walls 24 and 25 attached thereto in the manner described in detail hereinafter. Each of the outer shell members 23–25 is a relatively rigid, self-supporting body composed of Molded Fiberglass plastic. Throughout the length of the tank the outer shell 23–25 is spaced from the inner shell 20–22.

In the illustrated embodiment, at four spaced points along its length the tank is provided with a reinforcing ring assembly. Each ring assembly comprises a rigid steel ring 26a, 26b, 26c or 26d of rectangular cross-section (FIG. 1) which engages and reinforces the outside of the cylindrical side wall 20 of the inner shell. Each ring is bonded to the inner shell side wall. An insulating gasket 27 is engaged between the outer side of the ring and the interior of the side wall 23 of the outer shell. This gasket insulates the respective reinforcing ring from the outer shell.

Insulation 28 fills the space between the outer shells of the tank through its length and at the ends, so that the outer and inner shells are substantially completely insulated from each other.

At each end of the tank the end cover 24 (or 25) of the outer shell is attached in the manner shown in enlarged detail in FIG. 8. There, a flat annular steel member 29 is welded to the axially inward side of the reinforcing ring 26a. This annular member 29 extends radially outward at the axially inward side of the rubber gasket 27 there and engages the axially inward end of the end cap 24. The latter is snugly received within the adjacent end of the side wall 23 of the outer shell. At its radially outward end the annular member 29 engages the inside of the outer shell side wall 23.

Figure 3:
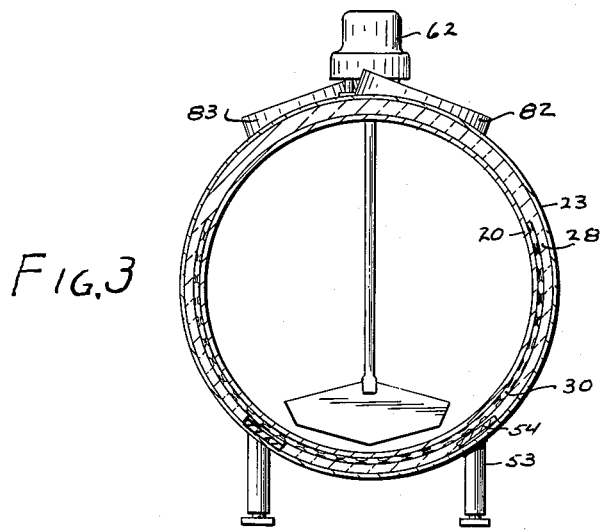
FIGURE 3 is a transverse vertical section through the tank, taken on the line 3—3 in FIG. 1.
Figure 4:
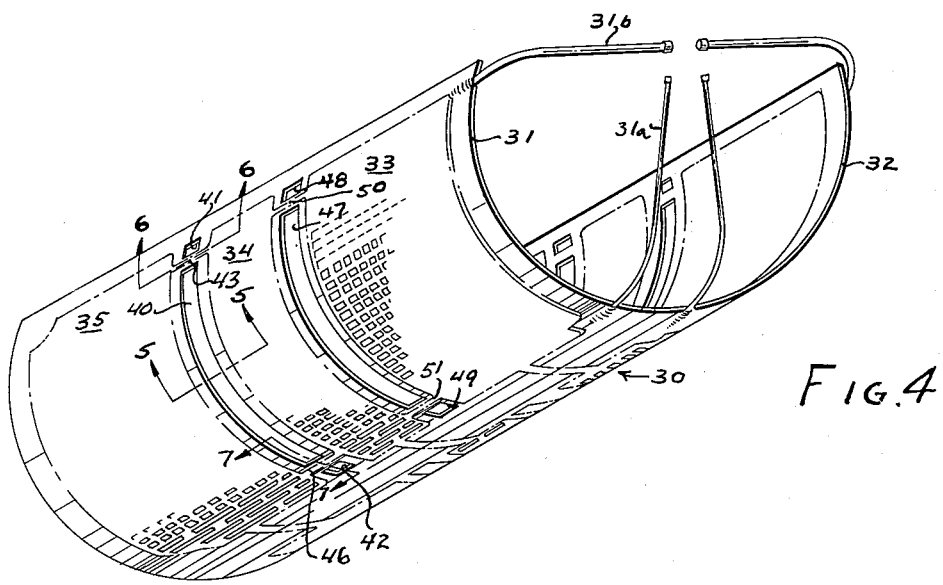
FIGURE 4 is a perspective view showing the refrigerant-carrying evaporator used in the present tank.

An evaporator, indicated generally by the reference number 30 in FIGS. 1, 3 and 4, lies flush against the outside of the side wall 20 of the inner shell. As shown in FIG. 1, the evaporator extends lengthwise between the reinforcing rings 26a and 26d which are located at the respective opposite ends of the tank.

Referring to FIG. 4, the evaporator is in the form of two metal plates 31 and 32, which abut against each other at their lower edges running lengthwise along the bottom of the tank. Each of the evaporator plates has three axially spaced interconnected sections 33, 34 and 35. This provides a plurality of spaced passages which run lengthwise and a plurality of passages which run perpendicular to, and intersect, the lengthwise passages. This passage arrangement provides a rapid and even distribution of the refrigerant fluid over the entire section of the evaporator.

The inner side 37 of the evaporator plate at each of these passages is in metal-to-metal contact with the outside of the inner shell side wall 20. Between the passages the evaporator plate presents a solid portion 38 which is spaced radially outward from the inner shell side wall 20. A heat conducting mastic 39 fills the spaces between the portions 38 of the evaporator plate and the inner shell side wall 20.

Referring to FIG. 4, the neighboring sections 35 and 34 of the evaporator plate 31 are separated by an elongated cutaway opening 40 and smaller openings 41 and 42 at either end of the latter. Between the openings 40 and 41 the sections 35 and 34 are connected by a narrow integral portion 43 of the evaporator plate which is formed with a pair of lengthwise passages which provide fluid communication between the passages in the respective sections 34 and 35. One of these connecting passages 44 is shown in FIG. 6.

A similar arrangement is provided at the narrow connecting portion 46 which connects the sections 34 and 35 of evaporator plate 31 between the cut-outs 40 and 42 therein.

Likewise, the sections 33 and 34 of evaporator plate 31 are separated by an elongated cut-away opening 47 and smaller openings 48 and 49 at either end of the latter. A narrow connecting portion 50 of evaporator plate 31 extends between the latter's sections 33 and 34 between the openings 47 and 48 and provides a pair of passages which interconnect the passages in sections 33 and 34. A similar connecting portion 51 connects the evaporator plate sections 3 and 34 between the openings 47 and 49 therein.

The evaporator plate 31 is provided with a narrow inlet tube 31a, at its lower right end in FIG. 4, through which the refrigerant flows into the interconnected passages in section 33 of this plate. Part of the refrigerant flows over to the neighboring sections 34 and 35 of this evaporator plate. The refrigerant flows up through the transverse passages in each section of the evaporator plate and is withdrawn through the outlet line 31b, which is connected to the top of the evaporator plate, at the right end in FIG. 4.

The other evaporator plate 32 is identical in construction, having three interconnected sections separated by cut-out portions and having a similar inlet and outlet tubing arrangement.

With this construction each evaporator plate has three axially spaced apart sections which are interconnected so that the refrigerant is free to flow from one to the other.

The purpose of the cut-away openings between the adjacent sections of each evaporator plate is to receive the two middle reinforcing rings 26b and 26c so that the latter may engage and reinforce the inner shell side wall 20 throughout substantially their entire extent.

As shown in FIG. 5, at the elongated opening 40 between sections 34 and 35 of evaporator plate 31 the corresponding reinforcing ring 26b directly engages the outside of the side wall 20 of the inner shell of the tank throughout substantially the entire length of the elongated opening 40 in the evaporator plate.

At the connecting segment 43 of the evaporator plate 31 at the upper end of opening 40, the inner side of the reinforcing ring 26b is cut-away, as shown in FIG. 6, so that it extends across the connecting segment 43 in outwardly spaced relation thereto.

The reinforcing ring 26b is similarly cut away at the connecting segment 46 of the evaporator plate 31 at the lower end of opening 40.

At each of the small openings 41 and 42 in the evaporator plate the reinforcing ring 26b directly engages the inner shell, as shown in FIG. 7.

Above the top edge of evaporator plate 31 and over to the top edge of the opposite evaporator plate 32, the reinforcing ring 26b directly engages the outside of the side wall 20 of the inner shell.

The reinforcing ring is cut away at its inner side to accommodate the connecting segments of the other evaporator plate 32 in the same manner. At the openings in the evaporator plate 32 the reinforcing ring 26b is in direct engagement with the outside of the side wall 20 of the inner shell.

At the bottom ends of the evaporator plates 31 and 32 the reinforcing ring 26b is cut away at its inner side to extend in outwardly spaced relation to the evaporator plates there.

Therefore, throughout all but a small fraction of its extent, the middle reinforcing ring 26b provides a rigid reinforcement for the side wall 20 of the inner shell of the tank.

The other middle reinforcing ring 26c is identical in construction and engages the side wall 20 of the inner shell at the openings 47, 48 and 49 in evaporator plate 31, at the corresponding openings in the opposite evaporator plate 32, and at the top third of the inner shell between the top edges of the evaporator plates 31 and 32.

With this construction, the middle reinforcing rings 26b and 26c effectively reinforce the side wall 20 of the inner shell at the middle. At the same time, these reinforcing rings do not interfere with the flow of refrigerant between the adjacent sections of the evaporator plates.

The end reinforcing rings 26a and 26d throughout their respective extents are in direct engagement with the inner shell side wall 20 to reinforce the latter.

The reinforcing rings 26a–26d also form part of the arrangement by which the tank is supported from the floor. As shown in FIGS. 1 and 3, the tank is provided with four legs 53 which rest on the floor. At their upper ends these legs are welded to rigid steel bars 54 which extend lengthwise of the tank on opposite sides near the bottom. These bars 54, in turn, are welded to each of the reinforcing rings 26a–26d. Thus, the legs 53, bars 54 and reinforcing rings 26a–26d together make up a rigid framework which physically supports the tank above the floor.

Another important aspect of the present invention is concerned with the mounting of the motor-driven agitator which stirs the milk in the tank. As shown in FIG. 1, this agitator includes a paddle 60 connected to the lower end of a vertically disposed shaft 61. Referring to FIG. 9, the shaft 61 is driven by a motor 62. The motor is supported by three depending legs, which are formed at their lower ends with upwardly extending sockets 64. These sockets receive upstanding pins 65 which extend up from a support plate 66. A set screw 67 is provided at each leg 63 to secure it to the corresponding pin 65.

The support plate is formed with a flat top face and a depending annular flange 68 at its periphery. Offset from its center the support plate has an upstanding circular flange 69 which defines a vertical opening.

A generally frusto-conical metal member 70 has a cylindrical upper end 71 which is fixedly secured inside the upstanding flange 69 on the support plate 66, such as by welding. Thus, the support plate 66 and member 70 together constitute an integral rigid support member. At its lower end the metal member 70 has an annular transverse flange 72 which conforms to the shape of the top of the side wall 20 of the inner shell of the tank. The flange 72 is welded to the side wall 20 around an opening 73 therein which is much larger than the shaft 61.

In this manner, the side wall 20 of the inner shell of the tank provides the physical support for the metal member 70, support plate 66, motor 62, shaft 61 and paddle 60.

As shown in FIGS. 1 and 9, the top of the support plate 66 is disposed slightly above the top of the side wall 23 of the outer shell of the tank. The depending peripheral flange 68 on the support plate extends down through an opening in the top of the tank side wall 23. A reinforcing ring 74, which is welded to the flange 68, extends beneath the top of the side wall 23. It should be noted, however, that the physical support for the agitator assembly, including the support plate 66, is provided solely by the stainless steel side wall 20 of the inner shell of the tank.

In accordance with the present invention, a slinger 75 of rubber or equivalent material is mounted to provide a seal between the shaft 61 and the flat top of the mounting plate 66. This slinger has a relatively thick, stiff top wall 76 having a central opening 77 therein which is conical, tapering inwardly toward its upper end. The shaft 61 is loosely disposed within the lower end of the opening 77. The slinger is formed with an upstanding circular flange 78 which extends around the upper end of the opening 77 and provides a snug seal for the shaft 61 thereat. The upstanding flange 78 is substantially thinner than the stiff top wall 76 of the slinger and is sufficiently flexible and resilient to permit the shaft 61 to be slightly off-center without affecting the seal or causing undue wear on the slinger. At its periphery the top wall 76 of the slinger is joined to a depending annular flange 79 which progressively decreases in thickness toward its lower end. This flange rests on the flat top wall of the support plate 66 in spaced relation to the latter's upstanding flange 69. The flange 79 provides a seal between the slinger 75 and the tank as a whole.

With this arrangement the slinger 75 is capable of sliding across the flat top of the support 66 without ruining the seal thereat and is adapted to yield at its upstanding flange 78 without affecting its seal with the shaft. Therefore, a highly effective seal is provided. At the same time, if the agitator shaft is slightly off-center it will not cause undue wear on the slinger which provides this seal, or grind bits of rubber off the slinger which can drop into the milk. Moreover, cleaning around the slinger, and stainless steel agitator and agitator opening by means of a mechanical spray operated inside the tank is made possible by this umbrella type of slinger.

The milk tank is provided with one or more access openings 80 and 81 for inspection and cleaning purposes. If more than one of these openings are located toward the opposite ends of the tank and are offset 20° from the longitudinal center line along the top of the tank, on opposite sides of that centerline. The openings are formed by circular metal collars 82 and 83 respectively, which extend outward from the side wall 20 of the inner shell and project outside the side wall 23 of the outer shell. Suitable covers, not shown, are provided for closing said openings.

With the access openings offset from the top centerline of the tank as described, they are readily accessible to a man standing alongside the tank who wants to clean the inside of the tank. At the same time, these access openings are so close to the top of the tank that very little reduction in the storage capacity of the tank results from their offset location.

From the foregoing, it will be apparent that the illustrated embodiment of the present tank effectively accomplishes the stated purpose of this invention and avoids the disadvantages associated with previous tanks of this general type. However, it is to be understood that various modifications, omissions and refinements which depart from the particular tank structure described and illustrated herein may be adopted without departing from the spirit and scope of the present invention.

I claim:
1. A storage tank comprising an outer shell, an inner shell having a cylindrical side wall disposed within said outer shell in spaced relation thereto, evaporator plate means disposed within said outer shell and curving around the outside of said inner shell in contact therewith, said evaporator plate means having a plurality of sections which are spaced apart lengthwise along the inner shell and which have passages therein for the flow of refrigerant, said evaporator plate means having cut-away portions between said sections and narrow segments at the ends of said cut-away portions which interconnect said sections, said narrow segments having passages therein for passing refrigerant between said sections, and a plurality of rigid reinforcing rings disposed within said outer shell and extending around the outside of said inner shell perpendicular to the latter's length, a pair of said rings being disposed at opposite ends of said evaporator plate means and throughout their extent engaging the outside of said inner shell entirely therearound, and an additional pair of said rings extending around said inner shell at said cut-away portions of said evaporator plate means, said additional pair of rings engaging the outside of said inner shell throughout substantially the entire extent of said cut-away portions, said additional pair of rings at their inner sides passing across said narrow segments of the evaporator plate means in outwardly spaced relation thereto, and said additional pair of rings engaging the outside of said inner shell throughout their extent between the opposite lengthwise edges of said evaporator plate means.

2. The tank of claim 1, wherein said evaporator plate means extends around said inner shell in heat transfer relationship thereto at the bottom of said inner shell and upward along the sides of the inner shell.

3. The tank of claim 2, wherein said sections of the evaporator plate means have a plurality of passages therein which run lengthwise along the inner shell and which are spaced apart transversely of the inner shell, and a plurality of transverse passages which intersect said lengthwise passages and run upward around the inner shell and which are spaced apart from each other lengthwise of the inner shell.

4. The tank of claim 1, wherein there is provided insulating material engaged between the outside of said reinforcing rings and the inside of said outer shell, and additional insulating material filling the space between said sections of the evaporator plate means and the outer shell.

5. The tank of claim 1, wherein said inner shell is of stainless steel, and said outer self supporting walls made of Molded Fiberglass.

6. A storage tank comprising an outer shell, an inner shell disposed within said outer shell, evaporator plate means disposed within said outer shell and contacting the outside of said inner shell, said evaporator plate means having a plurality of sections having passages therein for the flow of refrigerant, said evaporator plate means having transverse cut-away portions between said sections and narrow connecting portions which connect said sections and which have passages therein for passing refrigerant between the sections, and a plurality of rigid reinforcing rings disposed within said outer shell and extending transversely around the outside of said inner shell in engagement therewith, certain of said reinforcing rings engaging said inner shell at said cut-away portions of said evaporator plate means, said certain rings being cut away at their inner sides at said narrow connecting portions of said evaporator plate means and passing across said narrow connecting portions in spaced relation thereto.

7. A storage tank comprising an outer shell, an inner shell disposed within said outer shell, evaporator plate means disposed within said outer shell and outside said inner shell in heat transfer relationship thereto, said evaporator plate means having axially spaced sections having passages therein for the flow of refrigerant, said evaporator plate means having a transverse cut-away portion between said sections and connecting segments located at opposite ends of said cut-away portion which interconnect said sections, said connecting segments having passages therein for passing refrigerant between said sections, and a plurality of rigid reinforcing rings engaging the outside of said inner shell, one of said reinforcing rings engaging the outside of said inner shell at said cut-away portion of said evaporator plate means, said one ring passing over said connecting segments of said evaporator plate means.

References Cited in the file of this patent

UNITED STATES PATENTS

| | | |
|---|---|---|
| 1,281,549 | Frey | Oct. 15, 1918 |
| 2,144,715 | Dalzell et al. | Jan. 24, 1939 |
| 2,167,000 | Nilson et al. | July 25, 1939 |
| 2,568,653 | Mojonnier et al. | Sept. 18, 1951 |
| 2,647,733 | Knowles et al. | Aug. 4, 1953 |
| 2,824,431 | Pearson | Feb. 25, 1958 |
| 2,824,432 | Varese et al. | Feb. 25, 1958 |